(12) United States Patent
Ma et al.

(10) Patent No.: US 11,360,803 B2
(45) Date of Patent: *Jun. 14, 2022

(54) METHOD AND APPARATUS FOR EXECUTING NON-MASKABLE INTERRUPT

(71) Applicant: HUAWEI TECHNOLOGIES CO., LTD., Guangdong (CN)

(72) Inventors: Jun Ma, Shenzhen (CN); Tianhong Ding, Hangzhou (CN); Zhaozhe Tong, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/207,186

(22) Filed: Mar. 19, 2021

(65) Prior Publication Data
US 2021/0208925 A1    Jul. 8, 2021

Related U.S. Application Data

(63) Continuation of application No. 16/592,144, filed on Oct. 3, 2019, now Pat. No. 10,970,108, which is a
(Continued)

(30) Foreign Application Priority Data

Oct. 16, 2015    (CN) .......................... 201510677146.4

(51) Int. Cl.
G06F 9/48     (2006.01)
G06F 13/24    (2006.01)
(Continued)

(52) U.S. Cl.
CPC ............... *G06F 9/48* (2013.01); *G06F 1/24* (2013.01); *G06F 9/4812* (2013.01);
(Continued)

(58) Field of Classification Search
None
See application file for complete search history.

(56) References Cited

U.S. PATENT DOCUMENTS 5,291,604 A    3/1994    Kardach et al.
7,117,284 B2   10/2006   Watt et al.
(Continued)

FOREIGN PATENT DOCUMENTS

CN    1070496      3/1993
CN    102483713    5/2012
(Continued)

OTHER PUBLICATIONS

ARMv7-A and ARMvT-R edition, Architecture Reference Manual, Jan. 1, 2014, XP055489246, pp. 1211-1255.
(Continued)

*Primary Examiner* — Michael Sun
(74) *Attorney, Agent, or Firm* — Fish & Richardson P.C.

(57) ABSTRACT

Method and systems for executing a non-maskable interrupt are provided. In one aspect, a method for executing a non-maskable interrupt includes: obtaining an interrupt request in a non-secure mode, and interrupting an operation of an operating system (OS); saving, in a secure mode, a status of the OS when the operation of the OS is interrupted; executing, in the non-secure mode, a procedure defined for the interrupt request; resume, in the secure mode, the status of the OS; and after resuming the status of the OS, continue executing the operation of the OS in the non-secure mode.

20 Claims, 4 Drawing Sheets

Related U.S. Application Data continuation of application No. 15/947,491, filed on Apr. 6, 2018, now Pat. No. 10,437,632, which is a continuation of application No. PCT/CN2016/101592, filed on Oct. 9, 2016.

(51) Int. Cl.
*G06F 1/24* (2006.01)
*G06F 11/07* (2006.01)

(52) U.S. Cl.
CPC ...... *G06F 11/0757* (2013.01); *G06F 11/0793* (2013.01); *G06F 13/24* (2013.01)

(56) References Cited

U.S. PATENT DOCUMENTS

| | | | |
|---|---|---|---|
| 7,130,951 | B1 | 10/2006 | Christie et al. |
| 7,165,135 | B1* | 1/2007 | Christie .................. G06F 21/74 710/269 |
| 7,603,551 | B2 | 10/2009 | McGrath et al. |
| 9,552,307 | B2* | 1/2017 | Kanai .................. G06F 12/1491 |
| 2003/0140205 | A1* | 7/2003 | Dahan .................. G06F 21/556 711/163 |
| 2005/0193259 | A1 | 9/2005 | Martinez et al. |
| 2008/0092145 | A1* | 4/2008 | Sun .................. G06F 12/1441 719/312 |
| 2008/0098264 | A1 | 4/2008 | Day et al. |
| 2009/0157936 | A1* | 6/2009 | Goss .................. G06F 9/4812 710/264 |
| 2010/0057960 | A1* | 3/2010 | Renno .................. G06F 12/1433 710/262 |
| 2012/0036299 | A1 | 2/2012 | Renno |
| 2012/0124420 | A1 | 5/2012 | Yamagami |
| 2013/0322447 | A1 | 12/2013 | DeCusatis et al. |

FOREIGN PATENT DOCUMENTS

| | | |
|---|---|---|
| CN | 102591719 | 7/2012 |
| CN | 102708015 | 10/2012 |
| CN | 105279021 | 1/2016 |
| GB | 2259167 | 3/1993 |

OTHER PUBLICATIONS

Extended European Search Report dated Jul. 9, 2018, in corresponding European Patent Application No. 16854908.7, 9 pages.
International Search Report dated Dec. 29, 2016 in corresponding International Patent Application No. PCT/CN2016/101592.
Written Opinion of the International Searching Authority dated Dec. 29, 2016 in corresponding International Patent Application No. PCT/CN2016/101592.
Anonymous, "Interrupt vector table," Wikipedia, Wikipedia Reference, Oct. 20, 2014, XP055489260, 2 pages.
EPO Communication pursuant to Article 94(3) EPC issued in European Application No. 16854908.7 dated Jun. 28, 2021, 6 pages.

\* cited by examiner

METHOD AND APPARATUS FOR EXECUTING NON-MASKABLE INTERRUPT

CROSS-REFERENCE TO RELATED APPLICATIONS

This application is a continuation of U.S. patent application Ser. No. 16/592,144, filed on Oct. 3, 2019, which is a continuation of U.S. patent application Ser. No. 15/947,491, filed on Apr. 6, 2018, now U.S. patent Ser. No. 10/437,632, which is a continuation of International Application No. PCT/CN2016/101592, filed on Oct. 9, 2016, which claims priority to Chinese Patent Application No. 201510677146.4, filed on Oct. 16, 2015. All of the afore-mentioned patent applications are hereby incorporated by reference in their entireties.

TECHNICAL FIELD

Embodiments of the present invention relate to the server field and, more specifically, to a method and an apparatus for executing a non-maskable interrupt.

BACKGROUND

Generally, a server imposes an extremely high requirement on system stability. A system status can be periodically saved when a system runs normally, and some key data also needs to be saved when the system is abnormal so as to provide data support for locating a system error cause. When the system runs normally, there may be multiple methods and means to save system data. However, when the system is abnormal—crash for a most severe case, all routine methods and means are infeasible, and all interrupts cannot be responded to. In this case, a non-maskable interrupt (NMI) mechanism is required to save data.

The NMI is an interrupt that cannot be masked by a central processing unit (CPU). Regardless of a status of an interrupt flag (IF) bit, the CPU needs to make a response after receiving a valid NMI. The NMI is generally used to process faults, such as a coprocessor operation error, a memory verification error, and an input/output (I/O) port verification error, and is used to save an error status, exception information, and the like of an operating system (OS). Therefore, the NMI is an extremely important fault locating means in the current server field, and also is an extremely important feature in terms of a product itself.

Currently, architectures such as X86 and Million Instructions Per Second (MIPS) have corresponding NMI implementation mechanisms. Mainly, an interrupt is triggered periodically or triggered by a hardware fault, and the interrupt cannot be masked. The interrupt can be responded to even if a deadlock occurs in the system. The architectures such as X86 and MIPS make, by means of hardware, the system save data related to the NMI and execute user-defined processing such as writing a system log and resetting a watchdog timer in a non-secure mode. However, in an advanced reduced instruction set computing machine (ARM) architecture, no corresponding hardware can implement the NMI in the non-secure mode. Moreover, the existing arm-v8 specification and software solution do not support the NMI mechanism. Therefore, a method needs to be provided to implement the NMI mechanism without hardware support.

SUMMARY

Embodiments of the present invention provide a method and an apparatus for executing a non-maskable interrupt, and an NMI mechanism can be easily implemented in an ARM architecture without depending on hardware.

According to a first aspect, the present invention provides a method for executing a non-maskable interrupt, including: obtaining a secure interrupt request in a non-secure mode, and interrupting an operation of an operating system OS, where the secure interrupt request cannot be masked; entering a secure mode by using the secure interrupt request, and saving, in the secure mode, an interrupt context of an OS status when the operation of the OS is interrupted; returning to the non-secure mode to execute user-defined processing; after the user-defined processing is completed, entering the secure mode again, and resuming the OS status in the secure mode according to the interrupt context; and returning to the non-secure mode again, and continuing to execute an operation of the OS.

Before the method is executed, a corresponding register and exception vector table may be preconfigured, so that a non-maskable interrupt procedure can be executed after the secure interrupt request is obtained.

For example, in an ARM architecture, an HQ bit of a register SCR_EL3 is preconfigured to 1. Therefore, when obtaining a secure interrupt request FIQ, a system can learn that the non-maskable interrupt needs to be executed, so as to turn to the exception vector table to search for a mode that the system needs to be routed to. In preconfiguration for the exception vector table, an address may be initialized to VBAR_EL3, so that the system enters the non-secure mode when executing the non-maskable interrupt.

Based on the foregoing technical solution, according to the method for executing a non-maskable interrupt in this embodiment of the present invention, a system enters, by using a secure interrupt request, a secure mode to save an interrupt context of an OS status during an interrupt; after returning to a non-secure mode to execute user-defined processing, enters the secure mode again to resume the OS status; and after resuming the OS status, returns to the non-secure mode again to continue to execute an operation of an OS. Therefore, an NMI procedure can be easily implemented without depending on hardware.

With reference to the first aspect, in an implementation manner of the first aspect, the returning to the non-secure mode to execute user-defined processing includes: after the interrupt context is saved in the secure mode, returning to the non-secure mode according to an exception return address of the secure mode, and executing a user-defined function to complete the user-defined processing.

With reference to either the first aspect or the foregoing corresponding implementation manner, in another implementation manner of the first aspect, before the returning to the non-secure mode according to an exception return address of the secure mode, and executing a user-defined function to complete the user-defined processing, the method further includes: calling an interface function when a kernel of the non-secure mode is started, where the interface function records an address of the user-defined function into the exception return address in the secure mode by using a secure monitor call SMC instruction.

With reference to any one of the first aspect or the foregoing corresponding implementation mariners, in another implementation manner of the first aspect, the method further includes: preconfiguring an address of a saving function in the exception vector table of the secure mode, where the saving function is used to save the interrupt context of the OS status when the operation of the OS is interrupted; and the entering a secure mode by using the secure interrupt request and saving, in the secure mode, an interrupt context of an OS status when the operation of the OS is interrupted includes: when the secure interrupt request is generated and the secure interrupt request cannot be masked, entering the secure mode according to the address of the saving function, to execute the saving function.

With reference to any one of the first aspect or the foregoing corresponding implementation manners, in another implementation manner of the first aspect, the entering a secure mode by using the secure interrupt request and saving, in the secure mode, an interrupt context of an OS status when the operation of the OS is interrupted may include: capturing, by using secure monitor Secure Monitor software running in the secure mode, the secure interrupt request to enter the secure mode, and saving, in the secure mode by using the Secure Monitor software, the interrupt context of the OS status when the operation of the OS is interrupted.

According to a second aspect, the present invention provides an apparatus for executing a non-maskable interrupt, including an interruption module, a saving module, a first execution module, a resumption module, and a second execution module, configured to execute the method for executing a non-maskable interrupt according to the first aspect and the implementation manners corresponding to the first aspect. The interruption module is configured to obtain a secure interrupt request in a non-secure mode, and interrupt an operation of an operating system OS. The saving module is configured to enter a secure mode by using the secure interrupt request, and save, in the secure mode, an interrupt context of an OS status when the operation of the OS is interrupted. The first execution module is configured to return to the non-secure mode to execute user-defined processing. The resumption module is configured to: after the user-defined processing is completed, enter the secure mode again, and resume the OS status according to the interrupt context. The second execution module is configured to return to the non-secure mode, and continue to execute an operation of the OS.

The apparatus for executing a non-markable interrupt mentioned in the second aspect may be a central processing unit CPU.

With reference to the second aspect, in an implementation manner of the second aspect, the first execution module is specifically configured to: after the interrupt context is saved in the secure mode, return to the non-secure mode according to an exception return address of the secure mode, and execute a user-defined function to complete the user-defined processing.

With reference to either the second aspect or the foregoing corresponding implementation manner, in another implementation manner of the second aspect, the apparatus further includes an interface calling module, configured to: before the first execution module returns to the non-secure mode according to the exception return address of the secure mode, and executes the user-defined function to complete the user-defined processing, call an interface function when a kernel of the non-secure mode is started, where the interface function records an address of the user-defined function into the exception return address of the secure mode in the secure mode by using a secure monitor call SMC instruction.

With reference to any one of the second aspect or the foregoing corresponding implementation manners, in another implementation manner of the second aspect, the saving module is specifically configured to capture, by using secure monitor Secure Monitor software running in the secure mode, the secure interrupt request to enter the secure mode, and save, in the secure mode by using the Secure Monitor software, the interrupt context of the OS status when the operation of the OS is interrupted.

With reference to any one of the second aspect or the foregoing corresponding implementation manners, in another implementation manner of the second aspect, the apparatus further includes a preconfiguration module, configured to preconfigure an address of a saving function in an exception vector table of the secure mode, where the saving function is used to save the interrupt context of the OS status when the operation of the OS is interrupted; and the saving module is specifically configured to: when the secure interrupt request is generated, and the secure interrupt request cannot be masked, directly enter the secure mode according to the address of the saving function that is preconfigured by the preconfiguration module, to execute the saving function.

According to a third aspect, the present invention provides an apparatus for executing a non-maskable interrupt, including a processor, a memory, and a transceiver. The memory is configured to store an instruction. The processor is configured to execute the instruction stored by the memory to control the transceiver to receive and send a signal. When the processor executes the instruction stored by the memory, the apparatus is configured to execute the method according to the first aspect and the implementation manners corresponding to the first aspect.

In the apparatus for executing a non-markable interrupt in the third aspect, the transceiver may be an interface, configured to receive a secure interrupt request sent by hardware to a CPU.

In the first aspect to the third aspect and the corresponding implementation manners, the secure interrupt request is a fast interrupt request FIQ.

In the first aspect to the third aspect and the corresponding implementation manners, the user-defined processing may be an instruction that is defined by a user and can be executed in the non-secure mode of a non-maskable interrupt procedure. The user-defined processing may include at least one of saving a system log, reporting an OS status, or resetting a watchdog timer.

In the first aspect to the third aspect and the corresponding implementation manners, the non-secure mode includes at least one of exception level EL0 or EL1 of an advanced reduced instruction set computing machine ARM architecture, and the secure mode includes EL3 of the ARM architecture.

In the first aspect to the third aspect and the corresponding implementation manners, the OS periodically triggers a watchdog to generate the secure interrupt request or a hardware fault triggers a watchdog to generate the secure interrupt request.

According to the method and the apparatus for executing a non-maskable interrupt in the embodiments of the present invention, corresponding preconfiguration is performed for a secure interrupt request, so that when the secure interrupt request is obtained, a secure mode is directly entered free from masking of hardware (such as MASK), to save an interrupt context of an interrupt procedure; then, switching is performed between the secure mode and a non-secure mode by using secure monitor software of the secure mode, to implement subsequent processing such as user-defined processing, OS status resumption, and continuing to execute an operation of an OS. Therefore, a non-maskable interrupt procedure can be easily implemented without depending on hardware.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

Figure 1:
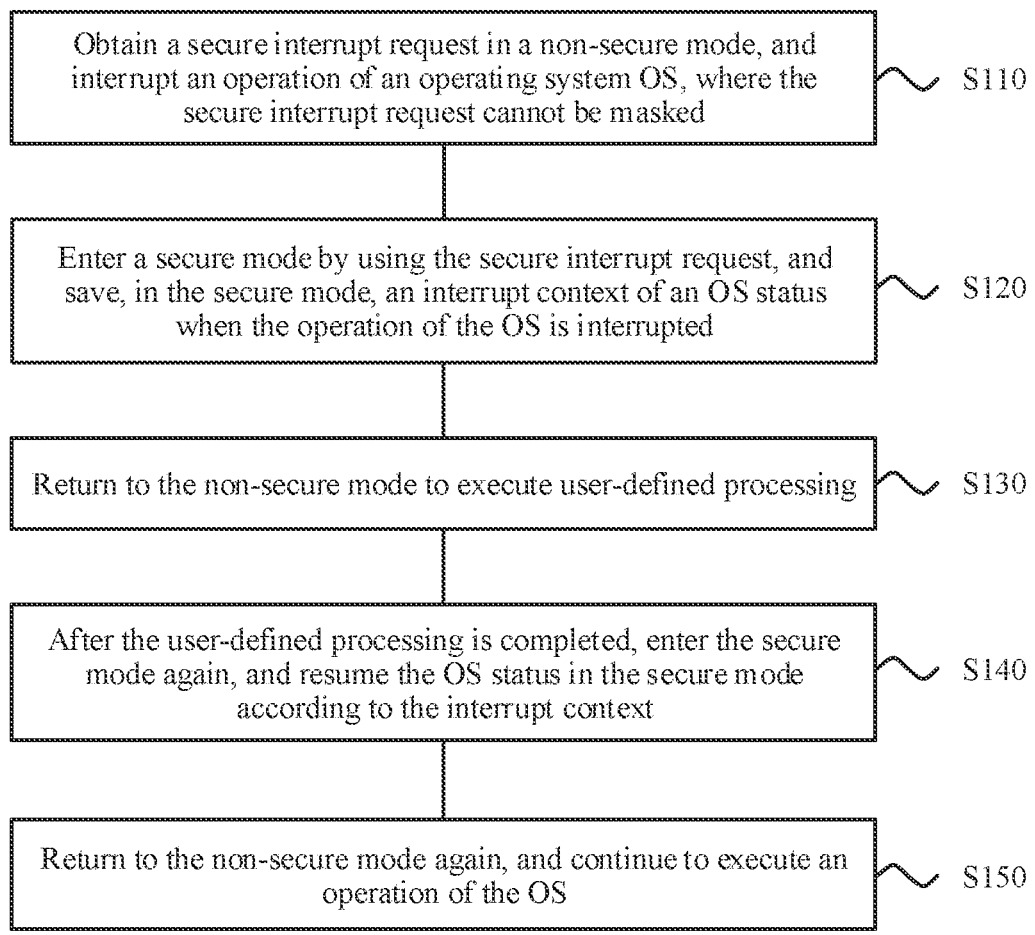
FIG. 1 is a schematic flowchart of a method for executing a non-maskable interrupt according to an embodiment of the present invention.

The following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

The following briefly describes several basic concepts related to embodiments of the present invention.

NMI: non-maskable interrupt, that is, interrupt that cannot be masked by a central processing unit (CPU). Regardless of a status of an interrupt flag (IF) bit, the CPU needs to make a response after receiving a valid NMI. The NMI is generally used to process faults, such as a coprocessor operation error, a memory verification error, and an input/output (I/O) port verification error, and is used to save an error status, exception information, and the like of an operating system (OS).

EL0: exception level 0, referring to a running environment of application software in an ARM architecture, belonging to a non-secure mode, and also referred to as Normal World.

EL1: exception level 1, referring to a running environment of a kernel in an ARM architecture, and belonging to a non-secure mode. The kernel is a kernel of an operating system, and refers to a core part of most operating systems (OS). The kernel includes parts that are in the OS and used to manage a memory, a file, a peripheral, and a system resource. The kernel is generally used to run a process and provide communication between processes.

EL3: Exception Level 3, generally used to run secure monitor software, such as open-source software Trust Firmware that can be obtained from the Internet, in an ARM architecture. EL3 belongs to a secure mode, and is also referred to as Secure World.

Secure interrupt request: interrupt that can be processed by code of a secure mode.

FIQ: fast interrupt request (FIQ). During interruption, a system performs optimization to reach a purpose of processing the request rapidly and in real-time. The FIQ needs to be processed as soon as possible and, after processing is completed, system software leaves this mode. An interrupt request (IRQ) may be interrupted by the FIQ, but the IRQ cannot interrupt the FIQ.

A method in the embodiments of the present invention may be applied to an ARM architecture, for example, applied to an ARM64 architecture; or may be applied to a system with a non-ARM architecture. All systems that can run secure monitor software or can generate an interrupt similar to a secure interrupt can use an idea of the present invention to implement an NMI mechanism.

According to a method for executing a non-maskable interrupt in the embodiments of the present invention, corresponding preconfiguration is performed for a secure interrupt request, so that when the secure interrupt request is obtained, a secure mode is directly entered free from masking of hardware (such as MASK), to save an interrupt context of an interrupt procedure. Then, switching is performed between the secure mode and a non-secure mode by using secure monitor software of the secure mode, to implement subsequent processing such as user-defined processing, OS status resumption, and continuing to execute an operation of an OS. Therefore, a non-maskable interrupt procedure can be easily implemented without depending on hardware.

Specifically, FIG. 1 is a schematic flowchart of a method 100 for executing a non-maskable interrupt according to an embodiment of the present invention. The method 100 may include the following steps:

S110. Obtain a secure interrupt request in a non-secure mode, and interrupt an operation of an operating system OS, where the secure interrupt request cannot be masked.

S120. Enter a secure mode by using the secure interrupt request, and save, in the secure mode, an interrupt context of an OS status when the operation of the OS is interrupted.

S130. Return to the non-secure mode to execute user-defined processing.

S140. After the user-defined processing is completed, enter the secure mode again, and resume the OS status in the secure mode according to the interrupt context.

S150. Return to the non-secure mode again, and continue to execute an operation of the OS.

Before the method is executed, a corresponding register and exception vector table may be preconfigured, so that a non-maskable interrupt procedure can be executed after the secure interrupt request is obtained.

For example, in an ARM architecture, an FIQ bit of a register SCR_EL3 is preconfigured to 1. Therefore, when obtaining a secure interrupt request FIQ, a system can learn that a non-maskable interrupt needs to be executed, so as to turn to the exception vector table to search for a mode that the system needs to be routed to. In preconfigumtion for the exception vector table, an address may be initialized to VBAR_EL3, so that the system enters the non-secure mode when executing the non-maskable interrupt.

It should be understood that the user-defined processing may be an instruction that is defined by a user and can be executed in the non-secure mode of a non-maskable interrupt procedure.

According to the method for executing a non-maskable interrupt in this embodiment of the present invention, a system enters, by using a secure interrupt request, a secure mode to save an interrupt context of an OS status during an interrupt; after returning to a non-secure mode to execute user-defined processing, enters the secure mode again to resume the OS status; and after resuming the OS status, returns to the non-secure mode again to continue to execute an operation of an OS. Therefore, an NMI can be easily implemented without depending on hardware.

The secure interrupt request in this embodiment of the present invention may be a fast interrupt request FIQ, or may be another type of secure interrupt request processed by code of the secure mode, and this is not limited in this embodiment of the present invention. This specification uses the FIQ as an example for description, and a case of another secure interrupt request is similar to this and is not repeatedly described.

This specification uses the ARM architecture as an example for description. In the ARM architecture, a non-secure mode may include at least one of EL0 or EL1, and a secure mode may include EL3.

Figure 2:
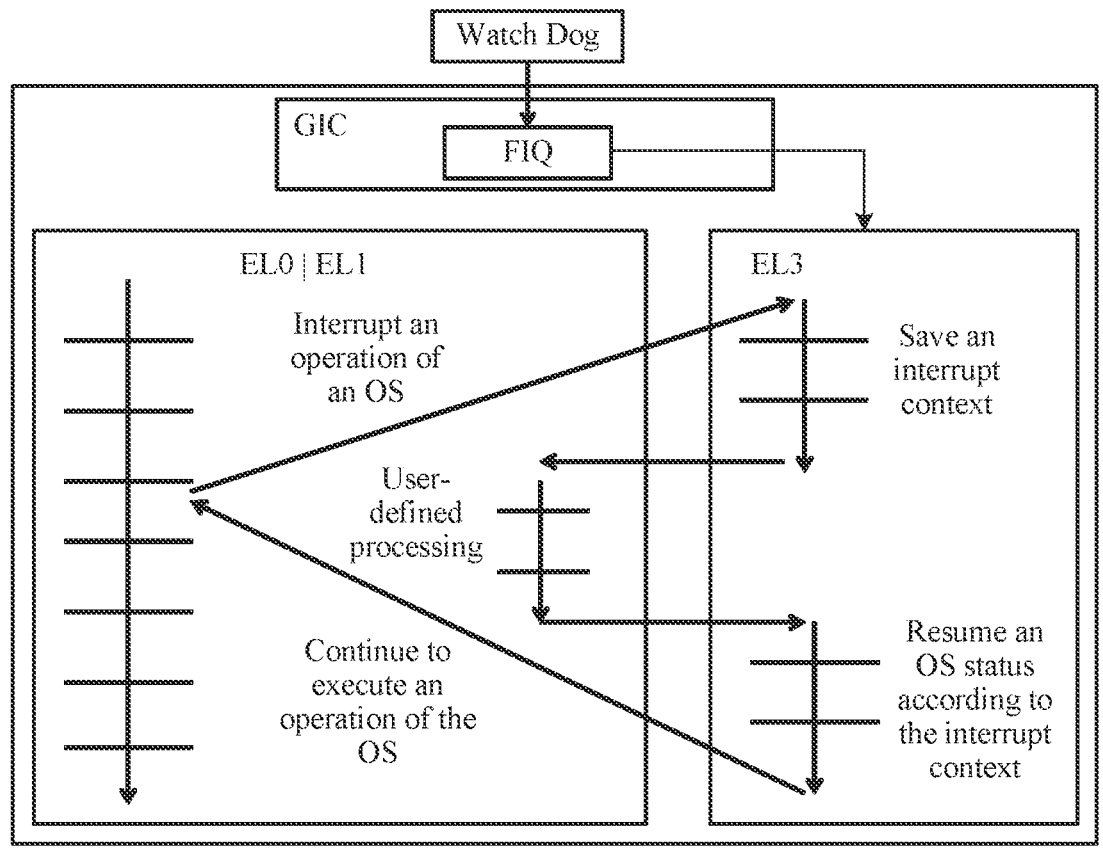
FIG. 2 is a schematic flowchart of a method for executing a non-maskable interrupt according to another embodiment of the present invention.
Figure 3:
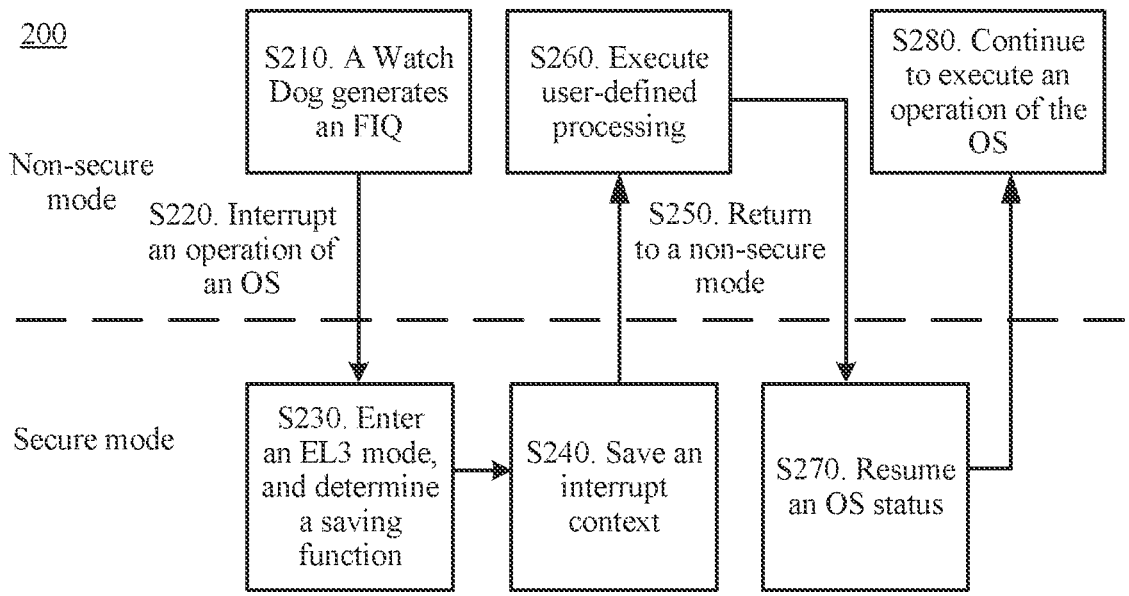
FIG. 3 is a schematic flowchart of a method for executing a non-maskable interrupt according to another embodiment of the present invention.

Specifically, FIG. 2 and FIG. 3 show schematic flowcharts of executing a non-maskable interrupt according to an embodiment of the present invention. A process of executing the non-maskable interrupt may include the following steps.

S210. A watchdog generates a secure interrupt request, where the secure interrupt request may be an FIQ. An OS may periodically trigger the watchdog to generate the secure interrupt request or a hardware fault triggers the watchdog to generate the secure interrupt request, and this is not limited in this embodiment of the present invention.

To ensure running stability, the OS needs to periodically save an OS status so as to periodically trigger the watchdog to generate the FIQ.

Hardware may be various types of hardware devices generating an interrupt, also referred to as an interrupt source, and may include a network card (that is, a network interface board, also referred to as a communications adapter, a network adapter, or a network interface card (NIC)), a hard disk (SATA), a watchdog, and the like. When a fault occurs on the hardware, the watchdog may be triggered to generate the FIQ.

S220. After the watchdog generates the FIQ, a generic interrupt controller (GIC) captures this interrupt request and sends the FIQ to an interface of a central processing unit (CPU). In this case, regardless of a status of the CPU, the CPU stops making a work response, that is, interrupts an operation of the OS, and processes the FIQ.

The GIC is a hardware module for controlling and reporting an interrupt and is a common module in an ARM architecture.

S230. The FIQ causes the CPU to enter an EL3 mode, and the FIQ cannot be masked and is captured by secure monitor software (such as trust firmware) running in the EL3 mode. After the secure monitor software captures the FIQ, the CPU determines an address of a saving function in the EL3 mode according to an exception vector table of the EL3 mode.

The FIQ cannot be masked so that the CPU enters the EL3 mode by means of preconfiguration, and this is specifically described in a preconfiguration procedure 300 in the following.

S240. Execute the saving function, and save, in the EL3 mode, an interrupt context (or referred to as a scenario) of an OS status when the operation of the OS is interrupted.

The interrupt context is related data generated when a system is interrupted. Generally, the interrupt context may include an X0-X30 status, ELR_EL3, an SPSR_EL3 status, and the like. X0-X30 is a general register, ELR_EL3 is an address in which the system exceptionally returns to another level from EL3, and SPSR_EL3 is a status of an exception return in EL3.

S250. After the interrupt context is saved, return to a user-defined function of a non-secure mode (in a kernel of an EL1 mode) according to an exception return address. Before the system returns to the non-secure mode, the saved interrupt context may be saved as a backup together with SP_EL0, SP_EL1, SP_EL2, and the like. SP_EL0 means data in a stack point (SP) of an EL0 level, SP_EL1 means data in an SP used by an EL1 level, and SP_EL2 means data in an SP used by an EL2 level.

The exception return address needs to be preconfigured by means of registration when the system is initialized, and this is specifically described in a preconfiguration procedure 400 in the following.

S260. In the kernel of the EL1 mode, execute the user-defined function to complete user-defined processing.

The user-defined processing may be an instruction that is defined by a user and can be executed in the non-secure mode of the non-maskable interrupt procedure. The user-defined processing may be customized by a user according to a system requirement, for example, may include at least one of saying a system log, reporting an OS status, or resetting a watchdog timer, so as to complete some usual subsequent processing of this interrupt, such as saving a system log, reporting an OS status of this interrupt, and emptying a Watch Dog timer.

The user-defined processing may further include some other processing defined by the user, and this is not limited in this embodiment of the present invention. The user-defined. function may include an address of a function entered when the EL3 mode is entered again.

In the EL3 mode of the ARM architecture, the user-defined processing in this embodiment of the present invention cannot be implemented. Therefore, the system needs to return to the non-secure mode (the EL1 mode) for execution.

S250 and S260 may correspond to S130 of returning to the non-secure mode to execute user-defined processing, and include: after the interrupt context is saved in the secure mode, returning to the non-secure mode according to the exception return address of the secure mode, and executing the user-defined function to complete the user-defined processing.

S270. After the user-defined processing is completed, enter, by using a general secure monitor call (SMC) instruction in the ARM architecture, EL3 from EL1 again, that is, the secure mode, and enter a function in S260. The function may be a resumption function, used to resume the OS status according to the interrupt context, and this embodiment of the present invention is not limited thereto.

S280. After the interrupt context is resumed, return to the non-secure mode, and continue to execute the operation of the OS when the interrupt is generated.

It should be understood that when the method in this embodiment of the present invention runs in the EL3 mode, corresponding processing may be completed by using the Secure Monitor software. The Secure Monitor software may be a type of software running in the EL3 mode. The Secure Monitor software may be executed each time the CPU is switched between the secure mode and the non-secure mode. The Secure Monitor software is mainly responsible for secure and stable switching of a context when the CPU is switched between the two modes. Therefore, it may be considered that an NMI mechanism in this embodiment of the present invention is implemented on a basis of software.

In this embodiment of the present invention, Trust Firmware software is used as an example of the Secure Monitor software for description. Certainly, other Secure Monitor software may also be used, and this is not limited in this embodiment of the present invention.

In this embodiment of the present invention, to enable the system to execute the non-maskable interrupt, the system needs to run the trust firmware software in the EL3 mode. In a system startup process, an FIQ needs to be preconfigured in a process of initializing the trust firmware, so that the FIQ can be used as a secure interrupt request.

Therefore, in this embodiment of the present invention, S120 of entering a secure mode by using the secure interrupt request, and saving, in the secure mode, an interrupt context of an OS status when the operation of the OS is interrupted may include: capturing, by using the secure monitor Secure Monitor software running in the secure mode, the secure interrupt request to enter the secure mode, and saving, in the secure mode by using the Secure Monitor software, the interrupt context of the OS status when the operation of the OS is interrupted.

Figure 4:
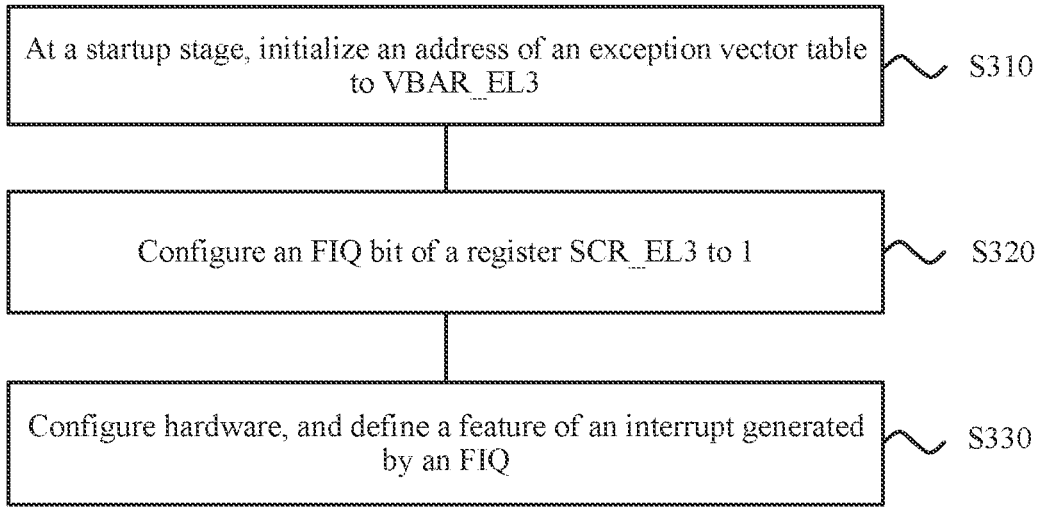
FIG. 4 is a schematic flowchart of preconfiguration of an FIQ according to an embodiment of the present invention.

Specifically, for example, a process of preconfiguring the FIQ may be the procedure 300 shown in FIG. 4, including the following steps:

S310. At a system startup stage, initialize an exception vector table, and initialize an address of the exception vector table (runtime_exceptions) to VBAR_EL3. Therefore, when the FIQ is captured, the CPU may enter the EL3 mode according to the exception vector table.

S320. Configure an FIQ bit of a register SCR_EL3 to 1. Therefore, when the FIQ is generated, the system may learn that the non-maskable interrupt needs to be executed, and then turns to the exception vector table to search for a mode that the system needs to be routed to.

S330. Configure hardware of the system, and define a feature of an interrupt generated by the FIQ. This step includes: configuring GICC FIQEn to 1, that is, an interrupt of Group0 is of an FIQ form, and configuring an FIQBypDisGrp0 bit of GICC to 0. Group0 and Group1 of GICD are enabled to set that interrupt enabling of all secure interrupt requests is cleared before an interrupt, and set no priority differentiation. GICC PMR is set to skip masking any interrupt. An interrupt priority corresponding to a secure interrupt number is set to 0, that is, a highest priority. An interrupt grouping register is set, that is, a corresponding secure interrupt number is set to Group0.

Corresponding to the method 100, the method 100 may further include: preconfiguring an address of a saving function in an exception vector table of the secure mode, where the saving function is used to save the interrupt context of the OS status when the operation of the OS is interrupted.

S120 of entering a secure mode by using the secure interrupt request and saving, in the secure mode, an interrupt context of an OS status when the operation of the OS is interrupted may include: when the secure interrupt request is generated, and the secure interrupt request cannot be masked, entering the secure mode according to the address, to execute the saving function.

It should be understood that the preconfiguration process may be executed in another process started by the system, other than executed when the trust firmware is initialized. Alternatively, the procedure may be divided and executed at different startup stages of the system, and a preconfiguration sequence may be not limited to the sequence provided in the procedure 300.

Figure 5:
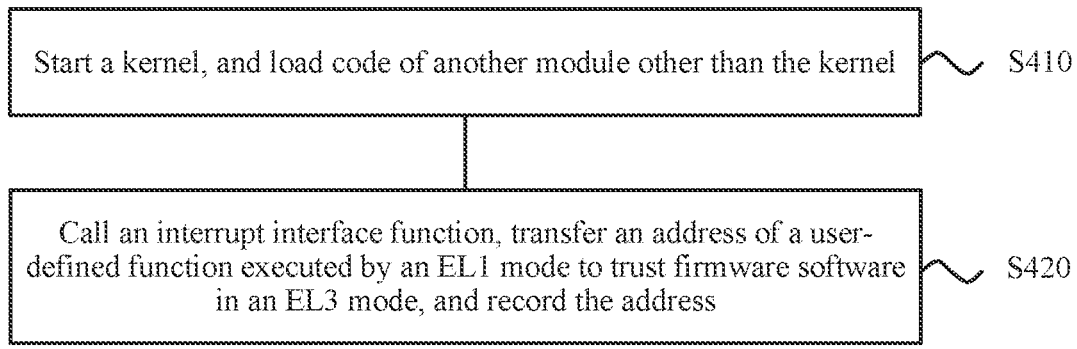
FIG. 5 is a schematic flowchart of preconfiguration of a user-defined function according to an embodiment of the present invention.

In this embodiment of the present invention, after the interrupt context is saved, the system returns to a user-defined function of a non-secure mode (in a kernel of the EL1 mode) according to the exception return address. The exception return address may be preconfigured according to the procedure 400 shown in FIG. 5 and is used to register, in the secure mode, an interrupt interface function of an NMI of an OS running in the non-secure mode.

S410. Start a kernel and load code of another module other than the kernel.

S420. Call an interrupt interface function (such as register_nmi_handler). An address of a user-defined function (such as nmi_handler) executed by the EL1 mode is transferred, by the function by using an SMC instruction, to trust firmware software in the EL3 mode and is recorded.

Specifically, the interrupt interface function may send two parameters to the trust firmware by using the SMC instruction. A parameter 0 is an address of a user-defined function, and the user-defined function may be a function customized by the user according to a requirement. A parameter 1 is an SMC function identifier (ID) and may be set to 0x83000000 according to an SMC calling specification, for example. 0x83000000 may be an identifier ID defined by an original equipment manufacture (OEM). 0x83000000 meets the SMC calling specification and implements a function of saving the address of the user-defined function. Then, the system enters the trust firmware software of the EL3 mode, confirms the SMC function ID, and saves a user-defined function nmi_handler.

Correspondingly, before the returning to the non-secure mode according to an exception return address of the secure mode and executing a user-defined function to complete the user-defined processing, the method further includes: calling an interface function when the kernel of the non-secure mode is started, where the interface function records an address of the user-defined function into the exception return address in the secure mode by using a secure monitor call SMC instruction.

It should be understood that another manner, such as an interrupt manner, may also be used in this embodiment of the present invention to transmit the address of the user-defined function to the trust firmware software, and this is not limited in this embodiment of the present invention.

In addition, in the ARM architecture in this embodiment of the present invention, when another type of interrupt occurs in the system, that is, a maskable interrupt, an IRQ may be still generated in the existing manner. Corresponding hardware such as IRQ MASK masks the maskable interrupt, so that the non-secure mode such as EL0 run by application software or EL1. run by the kernel does not sense the interrupt. An implementation manner of the maskable interrupt is not limited in this embodiment of the present invention.

It should also be understood that sequence numbers of the foregoing processes do not mean execution sequences in various embodiments of the present invention. The execution sequences of the processes should be determined according to functions and internal logic of the processes, and should not be construed as any limitation on the implementation processes of the embodiments of the present invention.

The method for executing a non-maskable interrupt according to embodiments of the present invention is described above in detail with reference to FIG. 1 to FIG. 5, and an apparatus for executing a non-maskable interrupt according to the embodiments of the present invention is described in detail in the following with reference to FIG. 6 and FIG. 7.

Figure 6:
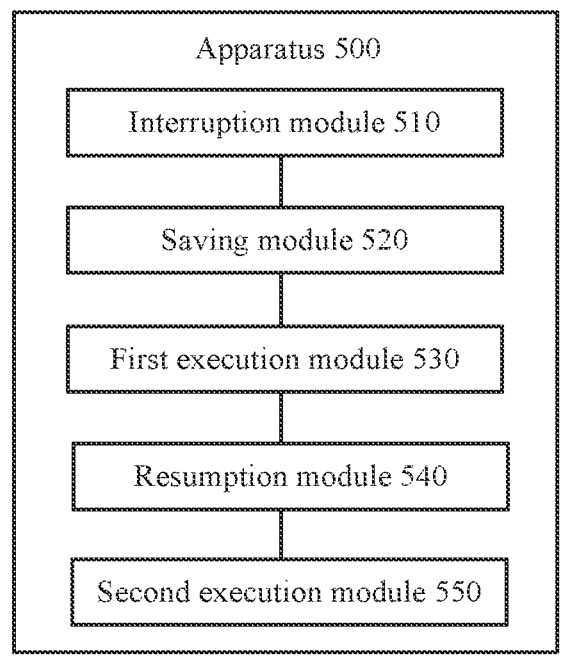
FIG. 6 is a schematic block diagram of an apparatus for executing a non-maskable interrupt according to an embodiment of the present invention.

As shown in FIG. 6, a apparatus 500 for executing a non-maskable interrupt includes: an interruption module 510, configured to obtain a secure interrupt request in a non-secure mode and interrupt an operation of an operating system OS, where the secure interrupt request cannot be masked; a saving module 520, configured to enter a secure mode by using the secure interrupt request, and save, in the secure mode, an interrupt context of an OS status when the operation of the OS is interrupted; a first execution module 530, configured to return to the non-secure mode to execute user-defined processing; a resumption module 540, configured to: after the user-defined processing is completed, enter the secure mode again, and resume the OS status in the secure mode according to the interrupt context; and a second execution module 550, configured to return to the non-secure mode again and continue to execute an operation of the OS.

Therefore, the apparatus for executing a non-maskable interrupt in this embodiment of the present invention enters, by using a secure interrupt request, a secure mode to save an interrupt context of an OS status during an interrupt; after returning to a non-secure mode to execute user-defined processing, enters the secure mode again to resume the OS status; and after resuming the OS status, returns to the non-secure mode again to continue to execute an operation of an OS. Therefore, an NMI mechanism can be easily implemented without depending on hardware.

In this embodiment of the present invention, the secure interrupt request may be a fast interrupt request FIQ.

In this embodiment of the present invention, the user-defined processing may include at least one of saving a system log, reporting an OS status, or resetting a watchdog timer.

In this embodiment of the present invention, the non-secure mode may include at least one of exception level EL0 or EL1 of an advanced reduced instruction set computing machine ARM architecture, and the secure mode may include EL3 of the ARM architecture.

In this embodiment of the present invention, the OS may periodically trigger a watchdog to generate the secure interrupt request or a hardware fault may trigger a watchdog to generate the secure interrupt request.

Optionally, in an embodiment, the first execution module 530 may be specifically configured to: after the interrupt context is saved in the secure mode, return to the non-secure mode according to an exception return address of the secure mode, and execute a user-defined function to complete the user-defined processing.

Optionally, in an embodiment, the apparatus 500 may further include: an interface calling module, configured to: before the first execution module 530 returns to the non-secure mode according to the exception return address of the secure mode and executes the user-defined function to complete the user-defined processing, call an interface function when a kernel of the non-secure mode is started, where the interface function records an address of the user-defined function into the exception return address in the secure mode by using a secure monitor call SMC instruction.

Optionally, in an embodiment, the apparatus 500 further includes: a preconfiguration module, configured to preconfigure an address of a saving function in an exception vector table of the secure mode, where the saving function is used to save the interrupt context of the OS status when the operation of the OS is interrupted; and the saving module 520 is specifically configuredto: when the secure interrupt request is generated, and the secure interrupt request cannot be masked, enter the secure mode according to the address of the saving function that is preconfigured by the preconfiguration module, to execute the saving function.

Optionally, in an embodiment, the saving module 520 may be specifically configured to: capture, by using secure monitor Secure Monitor software running in the secure mode, the secure interrupt request to enter the secure mode, and save, in the secure mode by using the Secure Monitor software, the interrupt context of the OS status when the operation of the OS is interrupted.

It should be understood that the apparatus 500 in this embodiment of the present invention may be a CPU.

It should also be understood that division of modules in the apparatus 500 is merely an example, is merely logical function division, and may be other division in actual implementation. The modules may exist independently, or may be combined. Preferably, the modules of the apparatus 500 may be integrated into one central module of the CPU, and configured to execute a non-maskable interrupt procedure.

It should also be understood that the apparatus 500 in this embodiment of the present invention may correspond to an execution body of executing a non-maskable interrupt in embodiments of the present invention, and the foregoing and other operations and/or functions of the modules in the apparatus 500 are respectively used to implement corresponding procedures in FIG. 1 to FIG. 5. For brevity, details are not repeatedly described herein.

Therefore, the apparatus for executing a non-maskable interrupt in this embodiment of the present invention enters, by using a secure interrupt request, a secure mode to save an interrupt context of an OS status during an interrupt; after returning to a non-secure mode to execute user-defined processing, enters the secure mode again to resume the OS status; and after resuming the OS status, returns to the non-secure mode again to continue to execute an operation of an OS. Therefore, an NMI mechanism can be easily implemented without depending on hardware.

In an embodiment of the present invention, a transceiver may obtain the secure interrupt request in the non-secure mode, and a processor may implement functions that are implemented by the interruption module 510, the saving module 520, the first execution module 530, the resumption module 540, and the second execution module 550. As shown in FIG. 7, an apparatus 600 for executing a non-maskable interrupt may include a processor 610, a transceiver 620, and a memory 630. The memory 630 may be configured to store code executed by the processor 610, and the like. The transceiver 620 may be an interface, configured to receive a secure interrupt request sent by hardware, such as a watchdog, to a CPU.

All components of the apparatus 600 are coupled together by using a bus system 640. In addition to a data bus, the bus system 640 includes a power bus, a control bus, a status signal bus, and the like.

Figure 7:
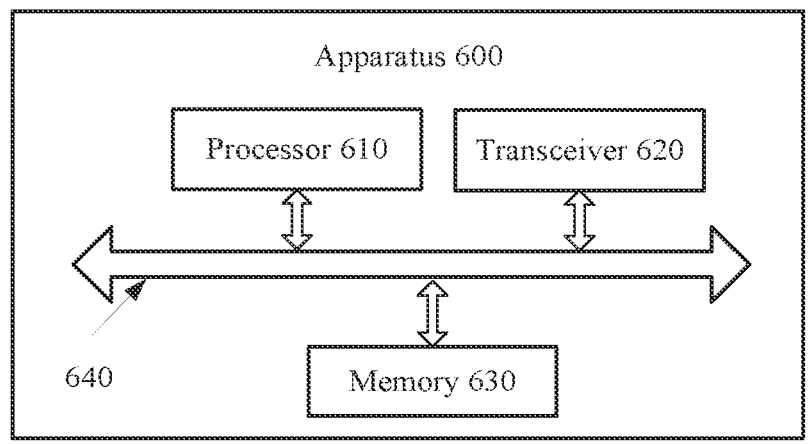
FIG. 7 is a schematic block diagram of an apparatus for executing a non-maskable interrupt according to another embodiment of the present invention.

The apparatus 600 shown in FIG. 7 can implement all processes that are implemented in the foregoing embodiments in FIG. 1 to FIG. 5. The apparatus 600 includes the processor 610, the transceiver 620, and the memory 630. The memory 630 is configured to store an instruction. The processor 610 is configured to execute the instruction stored by the memory 630 to control the transceiver 620 to receive and send a signal. When the processor 610 executes the instruction stored by the memory 630, the apparatus 600 is configured to complete the method for executing a non-maskable interrupt in embodiments of the present invention.

The transceiver 620 may be configured to obtain a secure interrupt request in a non-secure mode, and the secure interrupt request cannot be masked.

The processor 610 may be configured to: interrupt an operation of an operating system OS; enter a secure mode by using the secure interrupt request, and save, in the secure mode, an interrupt context of an OS status when the operation of the OS is interrupted; return to the non-secure mode to execute user-defined processing; after the user-defined processing is completed, enter the secure mode again and resume the OS status in the secure mode according to the interrupt context; and return to the non-secure mode again and continue to execute an operation of the OS.

Therefore, the apparatus for executing a non-maskable interrupt in this embodiment of the present invention enters, by using a secure interrupt request, a secure mode to save an interrupt context of an OS status during an interrupt; after returning to a non-secure mode to execute user-defined processing, enters the secure mode again to resume the OS status; and after resuming the OS status, returns to the non-secure mode again to continue to execute an operation of an OS. Therefore, an NMI mechanism can be easily implemented without depending on hardware.

In this embodiment of the present invention, the secure interrupt request may be a fast interrupt request FIQ.

In this embodiment of the present invention, the user-defined processing may include at least one of saving a system log, reporting an OS status, or resetting a watchdog timer.

In this embodiment of the present invention, the non-secure mode may include at least one of exception level EL0 or EL1 of an advanced reduced instruction set computing machine ARM architecture, and the secure mode may include EL3 of the ARM architecture.

In this embodiment of the present invention, the OS may periodically trigger a watchdog to generate the secure interrupt request or a hardware fault may trigger a watchdog to generate the secure interrupt request.

Optionally, in an embodiment, that the processor 610 returns to the non-secure mode to execute the user-defined processing may include: after the interrupt context is saved in the secure mode, returning to the non-secure mode according to an exception return address of the secure mode and executing a user-defined function to complete the user-defined processing.

Optionally, in an embodiment, before returning to the non-secure mode according to the exception return address of the secure mode, and executing the user-defined function to complete the user-defined processing, the processor 610 may be further configured to: call an interface function when a kernel of the non-secure mode is started, where the interface function records an address of the user-defined function into the exception return address in the secure mode by using a secure monitor call SMC instruction.

Optionally, in an embodiment, the processor 610 may be further configured to preconfigure an address of a saving function in an exception vector table of the secure mode, where the saving function is used to save the interrupt context of the OS status when the operation of the OS is interrupted.

That the processor 610 enters the secure mode by using the secure interrupt request and saves, in the secure mode, the interrupt context of the OS status when the operation of the OS is interrupted may include: when the secure interrupt request is generated, and the secure interrupt request cannot be masked, entering the secure mode according to the address of the saving function, to execute the saving function.

Optionally, in an embodiment, that the processor 610 enters the secure mode by using the secure interrupt request and saves, in the secure mode, the interrupt context of the OS status when the operation of the OS is interrupted may include: capturing, by using secure monitor Secure Monitor software running in the secure mode, the secure interrupt request to enter the secure mode and saving, in the secure mode by using the Secure Monitor software, the interrupt context of the OS status when the operation of the OS is interrupted.

It should be understood that the apparatus 600 in this embodiment of the present invention max be a CPU.

It should be noted that the foregoing method embodiments of the present invention may be applied to a processor, or implemented by a processor. The processor may be an integrated circuit chip and has a signal processing capability. In an implementation process, steps of the foregoing method embodiments may be completed by using an integrated logic circuit of hardware in the processor or an instruction in a form of software. The foregoing processor may be a general-purpose processor, a digital signal processor (DSP), an application-specific integrated circuit (ASIC), a field programmable gate array (FPGA) or another programmable logic device, a discrete gate or transistor logic device, or a discrete hardware component, which may implement or perform the methods, the steps, and logical block diagrams that are disclosed in the embodiments of the present invention. The general-purpose processor may be a microprocessor, or the processor may further be any conventional processor, or the like. Steps of the methods disclosed with reference to the embodiments of the present invention may be directly executed and accomplished by means of a hardware decoding processor, or may be executed and accomplished by using a combination of hardware and software modules in the decoding processor. The software module may be located in a mature storage medium in the art, such as a random access memory, a flash memory, a read-only memory, a programmable read-only memory, an electrically erasable programmable memory, a register, or the like. The storage medium is located in the memory, and a processor reads information in the memory and completes the steps in the foregoing methods combination with hardware of the processor.

It may be understood that the memory in the embodiments of the present invention may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through example but not restrictive description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct rambus dynamic random access memory (DR RAM). It should be noted that the memory of the system and method described in this specification includes but is not limited to these and any memory of another proper type.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing, to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A computer system, comprising at least one processing circuit and one or more memories coupled to the at least one processor, wherein the at least one processing circuit operates in at least two different modes: secure mode and non-secure mode, and wherein the one or more memories store programming instructions for execution by the at least one processing circuit to:
   obtain, in the non-secure mode, an interrupt request and interrupt an operation of an operating system (OS);
   save, in the secure mode, a status of the OS when the operation of the OS is interrupted;
   execute, in the non-secure mode, a procedure defined for the interrupt request;
   resume, in the secure mode, the status of the OS; and
   after resuming the status of the OS, continue executing the operation of the OS in the non-secure mode.

2. The computer system according to claim 1, wherein the one or more memories store programming instructions for execution by the at least one processing circuit to:
   record an address of the procedure defined for the interrupt request into an exception return address, wherein the processing circuit uses the exception return address in the secure mode to return to the non-secure mode after saving the status of the OS.

3. The computer system according to claim 1, wherein the interrupt request is a fast interrupt request (FIQ).

4. The computer system according to claim 1, wherein the procedure defined for the interrupt request comprises at least one of saving a system log, reporting an OS status, or resetting a watchdog timer.

5. The computer system according to claim 1, wherein the one or more memories store programming instructions for execution by the at least one processing circuit to:
   preconfigure an address of a saving function in an exception vector table of the secure mode, wherein the saving function saves the status of the OS when the operation of the OS is interrupted.

6. The computer system according to claim 1, wherein the non-secure mode comprises at least one of exception levels EL0 or EL1 of an advanced reduced instruction set computing machine (ARM) architecture, and the secure mode comprises exception level EL3 of the ARM architecture.

7. The computer system according to claim 1, wherein the OS periodically triggers a watchdog to generate the interrupt request or a hardware fault triggers a watchdog to generate the interrupt request.

8. The computer system according to claim 1, wherein the one or more memories store programming instructions for execution by the at least one processing circuit to:
   initialize an exception vector table; and
   initialize an address of the exception vector table to VBAR_EL3.

9. The computer system according to claim 8, wherein the one or more memories store programming instructions for execution by the at least one processing circuit to:
   configure an FIQ bit of a register SCR_EL3 to 1.

10. The computer system according to claim 9, wherein the one or more memories store programming instructions for execution by the at least one processing circuit:
    configure (1) GICC FIQEn to 1 and (2) an FIQBypDisGrp0 bit of GICC to 0;
    enable Group0 and Group1 of GICD and set no priority differentiation;

set GICC PMR; and set (1) interrupt priority of the FIQ to a highest priority and (2) a corresponding interrupt number to Group0.

11. A chipset system, comprising at least one processing circuit and one or more memories coupled to the at least one processor, wherein the at least one processing circuit operates in at least two different modes: secure mode and non-secure mode, and wherein the one or more memories store programming instructions for execution by at least one processing circuit to:

obtain, in the non-secure mode, an interrupt request and interrupt an operation of an operating system (OS);

save, in the secure mode, a status of the OS when the operation of the OS is interrupted;

execute, in the non-secure mode, a procedure defined for the interrupt request;

resume, in the secure mode, the status of the OS; and after resuming the status of the OS, continue executing the operation of the OS in the non-secure mode.

12. The chipset system according to claim 11, wherein the non-secure mode comprises at least one of exception levels EL0 or EL1 of an advanced reduced instruction set computing machine (ARM) architecture, and the secure mode comprises exception level EL3 of the ARM architecture.

13. The chipset system according to claim 11, wherein the one or more memories store programming instructions for execution by the at least one processing circuit to:

initialize an exception vector table; and initialize an address of the exception vector table to VBAR_EL3.

14. The chipset system according to claim 13, wherein the one or more memories store programming instructions for execution by the at least one processing circuit to:

configure an FIQ bit of a register SCR_EL3 to 1.

15. The chipset system according to claim 14, wherein the one or more memories store programming instructions for execution by the at least one processing circuit to:

configure (1) GICC FIQEn to 1 and (2) an FIQBypDis-Grp0 bit of GICC to 0;

enable Group0 and Group1 of GICD and set no priority differentiation;

set GICC PMR; and set (1) interrupt priority of the FIQ to a highest priority and (2) a corresponding interrupt number to Group0.

16. A method, performed by one or more processors, for executing a non-maskable interrupt, comprising:

obtaining, in a non-secure mode, an interrupt request and interrupting an operation of an operating system (OS);

saving, in a secure mode, a status of the OS when the operation of the OS is interrupted;

executing, in the non-secure mode, a procedure defined for the interrupt request;

resuming, in the secure mode, the status of the OS; and after resuming the status of the OS, continuing execution of the operation of the OS in the non-secure mode.

17. The method according to claim 16, wherein the non-secure mode comprises at least one of exception levels EL0 or EL1 of an advanced reduced instruction set computing machine (ARM) architecture, and the secure mode comprises exception EL3 of the ARM architecture.

18. The method according to claim 16, further comprising:

initializing an exception vector table; and initializing an address of the exception vector table to VBAR_EL3.

19. The method according to claim 16, further comprising:

configuring a fast interrupt request (FIQ) bit of a register SCR_EL3 to 1.

20. A chipset system, comprising a processing circuit and a non-transitory computer-readable storage medium coupled to the processing circuit, wherein the non-transitory computer readable medium stores instructions that when executed by the processing circuit, cause the processing circuit to:

obtain, in a non-secure mode of the processing circuit, an interrupt request and interrupt an operation of an operating system (OS);

save, in a secure mode of the processing circuit, a status of the OS when the operation of the OS is interrupted;

execute, in the non-secure mode, a procedure defined for the interrupt request;

resume, in the secure mode, the status of the OS; and after resuming the status of the OS, continue executing the operation of the OS in the non-secure mode.

* * * * *

UNITED STATES PATENT AND TRADEMARK OFFICE
CERTIFICATE OF CORRECTION

PATENT NO. : 11,360,803 B2  
APPLICATION NO. : 17/207186  
DATED : June 14, 2022  
INVENTOR(S) : Jun Ma, Tianhong Ding and Zhaozhe Tong Page 1 of 1

It is certified that error appears in the above-identified patent and that said Letters Patent is hereby corrected as shown below:

On the Title Page

Column 1 item [56] Line 1, Delete "ARMvT-R" and insert -- ARMv7-R --.

In the Specification

Column 1 Line 13, Delete "afore-mentioned" and insert -- aforementioned --.

Signed and Sealed this  
Fourth Day of October, 2022

Katherine Kelly Vidal  
*Director of the United States Patent and Trademark Office*